United States Patent [19]

Curhan

[11] Patent Number: 5,048,500

[45] Date of Patent: Sep. 17, 1991

[54] INTERNAL COMBUSTION ENGINE WITH FUEL INJECTORS AND HEATERS

[75] Inventor: Jeffrey A. Curhan, Medway, Mass.

[73] Assignee: Texas Instruments Incorporated, Dallas, Tex.

[21] Appl. No.: 570,662

[22] Filed: Aug. 22, 1990

[51] Int. Cl.⁵ .................... F02G 5/00; F02M 15/00
[52] U.S. Cl. .................................. 123/549; 123/470
[58] Field of Search .............. 123/470, 549, 552, 557

[56] References Cited

U.S. PATENT DOCUMENTS

| | | | |
|---|---|---|---|
| 3,760,780 | 9/1973 | Jordan | 123/549 |
| 4,276,864 | 7/1981 | Waschkuttis | 123/549 |
| 4,387,291 | 6/1983 | Keppel | 123/549 |
| 4,671,245 | 6/1987 | Knapp | 123/549 |
| 4,834,053 | 5/1989 | Van Der Ploeg et al. | 123/549 |
| 4,967,706 | 11/1990 | Van Wechem et al. | 123/188 M |

FOREIGN PATENT DOCUMENTS

| | | |
|---|---|---|
| 0234052 | 9/1987 | European Pat. Off. . |
| 3247978 | 6/1984 | Fed. Rep. of Germany . |
| 3426469 | 5/1986 | Fed. Rep. of Germany . |

Primary Examiner—Noah P. Kamen
Attorney, Agent, or Firm—James P. McAndrews; John A. Haug; Melvin Sharp

[57] ABSTRACT

An internal combustion engine of the injector type has self-regulating electrical resistance heating devices of positive temperature coefficient of resistivity arranged in cylinder head air-fuel inlet channels to intercept fuel directed into the channels by fuel injectors for heating and deflecting the fuel into respective cylinder intake valve openings. The heating devices and/or fuel injectors are movable after engine warm-up so that the fuel injectors thereafter spray fuel directly onto warmed-up intake valves in the valve openings without being intercepted by the heaters, whereby the heaters are adapted to be deenergized after engine warm-up without creating a cold spot in the engine fuel supply system at the heater location.

41 Claims, 4 Drawing Sheets

INTERNAL COMBUSTION ENGINE WITH FUEL INJECTORS AND HEATERS

BACKGROUND OF THE INVENTION

The field of the invention is that of internal combustion engines of the fuel injector type, and the invention relates more particularly to fuel injection engines having heating devices for heating fuel as it is furnished to engine cylinders.

It has been proposed that self-regulating electrical resistance heaters be arranged in air-fuel inlet channels in the cylinder head of an internal combustion engine of the fuel injector type to intercept fuel sprayed into the inlet channels by the fuel injectors. In that way the heaters heat the fuel just as it is furnished to the engine cylinders to enhance fuel vaporization and to reduce engine pollution emissions, particularly during the engine warm-up period. The heaters require a substantial amount of electrical power from the engine power supply and it would be desirable to deenergize the heaters after engine warm-up occurs. However, it is found that deenergizing of the heaters results in formation of cold spots at the heater locations which frequently interfere with full vaporizing of the fuel during normal running operation of the engine thereafter.

BRIEF SUMMARY OF THE INVENTION

It is an object of the invention to provide an improved internal combustion engine of the fuel injector type; to provide such an improved engine adapted to enhance fuel vaporization during engine warm-up for reducing engine pollution emissions and to reduce power consumption by the heater while maintaining the enhanced fuel vaporization during normal running of the engine after engine warm-up; to provide such an improved engine of reliable low-cost engine structure; to provide novel and improved fuel heaters for such improved engines; and to provide such improved fuel heaters adapted to be accommodated in engines having generally conventional engine components.

Briefly described, the novel and improved internal combustion engine of the injector type provided by the invention comprises cylinder heat means which have one or more inlet channels leading to respective cylinder intake valve means for furnishing a selected air-fuel mixture to each of the engine cylinders. An inlet tube member is sealed to the cylinder head to seal the inlet channels and furnish air to the inlet channels. Fuel injectors are arranged on the inlet tube member for example to spray or direct fuel from inlet tube passages into the inlet channels to form the desired air-fuel mixture for each cylinder. Self-regulating electrical resistance heating devices, preferably of positive temperature coefficient of resistivity, are arranged in the inlet channels to normally intercept fuel from the injectors to heat the fuel, thereby to enhance vaporization of the fuel and reduce pollution emissions from the engine. Preferably a support is secured between the cylinder head means and inlet tube member and the heating devices are mounted on the support to extend into the inlet channels. Preferably the heating devices also extend from the support into the passages in the inlet tube member to intercept and vaporize any fuel which may fall free from the fuel injector tips in large droplets in the inlet tube passages in coalesce as droplets therein. In accordance with the invention, the fuel injectors or the heating devices or both are selectively movable during or after engine warm-up or the like has occurred to permit the fuel to be thereafter directed into the inlet channels without being intercepted by the heating devices. In that way the fuel is adapted to be heated to be properly vaporized during normal engine running by impinging on the intake valves themselves or other selected, warmed-up components of the engine. Preferably means for moving and electrically energizing the heating devices are mounted on the same support which mounts the heating devices.

In one preferred embodiment of the invention, the fuel injectors and heating devices are arranged so the heating devices normally intercept fuel sprayed from the fuel injectors to heat the fuel and to deflect it into respective cylinder intake valve openings during the engine warm-up period. The fuel injectors and heating devices are selectively movable after engine warm-up occurs for example so the injectors thereafter spray fuel into the intake valve openings without being intercepted by the heating devices. In that arrangement, the fuel is heated and fully vaporized by impinging on the hot intake valves in the cylinder intake valve openings.

In another preferred embodiment of the invention, only the fuel injectors are movable, the injectors being movable from a first position in which they direct fuel onto respective heating devices in the inlet channels to be deflected toward the cylinder intake valve openings and a second position in which the injectors spray fuel directly toward the intake valve openings. In another preferred embodiment of the invention, only the heating devices are movable, the heating devices being movable from a first position in which they intercept and heat fuel from the injectors to deflect the heated fuel toward the cylinder intake valve openings and a second position in which the fuel from the injectors is permitted to be directed into the intake valve openings without being intercepted by the heating devices. In each of these arrangements, the internal combustion engines achieve improved heating and vaporizing of fuel furnished to the cylinders by the respective fuel injectors.

DESCRIPTION OF THE DRAWINGS

Other objects, advantages and details of the invention appear in the following detailed description of preferred embodiments of the invention, the detailed description referring to the drawings in which.

DESCRIPTION OF THE PREFERRED EMBODIMENTS

Figure 1:
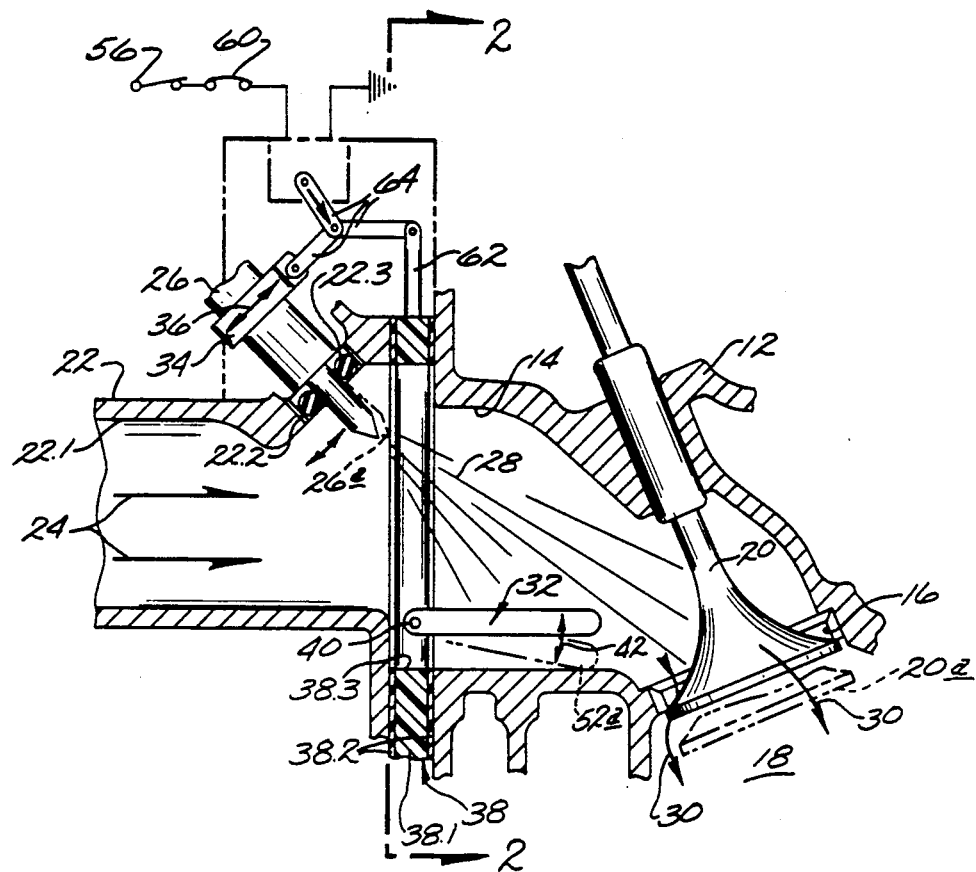
FIG. 1 is a partial section view along an axis through an inlet channel in a cylinder head of the internal combustion engine of the invention.
Figure 2:
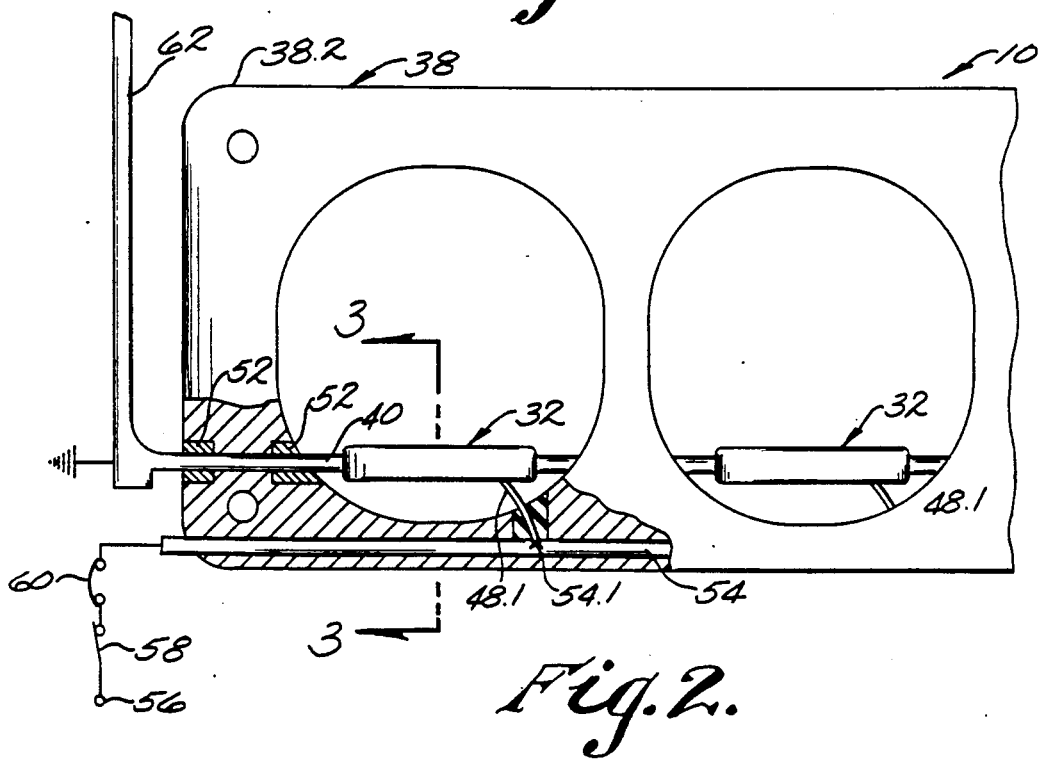
FIG. 2 is a partial section view along line 2—2 of FIG. 1.

Referring to the drawings, 10 in FIGS. 1 and 2 indicates the novel and improved internal combustion engine of the fuel injection type provided by the invention which is shown to include cylinder head means 12 having inlet channels 14 leading to respective cylinder intake valve openings 16, the engine having any desired number of engine cylinders as indicated at 18 in FIG. 1. Intake valves 20 are arranged in each intake valve opening for movement between the closed position indicated in solid lines and the open position indicated by broken lines 20a. An intake manifold or inlet tube means 22, preferably having an inlet tube passage 22.1 for each engine cylinder, is arranged in sealed relation to the cylinder head means for furnishing air to the inlet channels as indicated by arrows 24. Fuel injector means 26 are arranged to direct a spray or stream of fuel 28 into the respective inlet channels to be mixed with the air to form an air-fuel mixture, that mixture then being furnished to the respective engine cylinders when the valve 20 is open as indicated at 30. Preferably as shown the fuel injection nozzles are positioned in the inlet tube passages to spray the fuel into the inlet channels. Self-regulating electrical resistance heater means 32 are arranged to normally intercept the fuel 28 directed from the fuel injector means to heat the fuel for enhancing vaporization of the fuel just prior to the fuel being furnished to the engine cylinders. In that way, the engine is adapted to achieve improved efficiency in use of the fuel and to reduce pollution emissions from the engine, particularly during the engine warm-up period on a cold day as will be understood. In accordance with this invention, the fuel injector means and/or the electrical resistance heater means are selectively movable during or after the engine warm-up period is completed for example for permitting the fuel to be directed into the inlet channels without being intercepted by the heater means, whereby the heater means is adapted to be deenergized after engine warm-up to reduce electrical power consumption by the heating devices without risk that intercepting of the fuel by a cold heater might reduce fuel vaporization thereafter during normal running operation of the engine. That is, the fuel directed from the fuel injectors is thereafter adapted to impinge on, and to be heated and fully vaporized by, an engine component or components such as the intake valves in the valve openings which have become heated to a sufficient temperature during the engine warm-up period.

Preferably for example, the engine is provided with a plurality of cylinders (only one being shown in FIGS. 1-2), a plurality of intake valves 20 are movably mounted on the cylinder head 12 in conventional manner, and a plurality of fuel injectors 26 of any conventional type are mounted on the inlet tube member 22 to extend into respective inlet tube passages 22.1 to direct or spray fuel into respective inlet channels 14 in the cylinder head. Each fuel injector is sealingly positioned in an aperture 22.2 in the inlet tube member by a flexible sealing ring 22.3 or the like, and an injector yoke 34 is fitted around each fuel injector to connect the fuel injectors for movement together as indicated by arrow 36 in FIG. 1.

Figure 3:
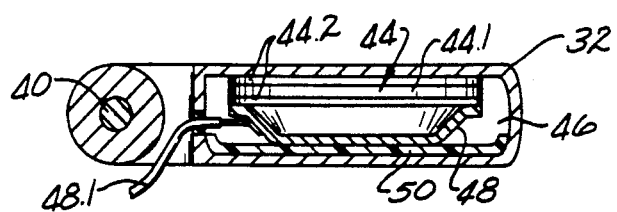
FIG. 3 is an enlarged partial section view along line 3—3 of the novel heater of the invention.

A support 38, preferably having a body portion 38.1 of electrically insulating phenolic or composite material or the like, is secured between the cylinder head and inlet tube member to sealingly connect the inlet tube passages with the respective inlet channels through openings 38.3 in the support. If desired, compressible gasket sealing skin portions 38.2 are adhered to opposite sides of the support for example. A plurality of self-regulating electrical resistance heating devices 32 are mounted on a shaft 40 rotatably mounted in the support 38 so that the heating devices extend into the respective inlet channels and so that the heating devices are movable with the shaft as indicated by the arrow 42 as the shaft 40 is rotated. Preferably for example, as best shown in FIG. 3, each heating device 32 comprises an element 44 having a body 44.1 of a ceramic material such as lanthanum-doped barium titanate or the like of positive temperature coefficient of resistivity (PTC) having electrical contacts 44.2 of metal or the like on two opposite sides, the element being disposed in a metal heat-sink chamber 46 with one contact electrically grounded to the chamber. A spring terminal 48 positioned in the chamber locates the heating element in the chamber, is insulated from the chamber by an insulator strip 50, and electrically engages the other contact on the heating element. A lead 48.1 from the spring terminal extends from the chamber for connecting the heater to an energizing automotive power source.

Preferably the shaft 40 is mounted in sealing bushings 52 or the like in the insulating support 38 and is connected to electrical ground as indicated in FIG. 2. The leads 48.1 from the individual heating devices are electrically connected to a bus bar 54 embedded in the insulating support by a weld 54.1 or the like. Preferably the bus bar is connected to the power source diagrammatically indicated at 56 in FIG. 6 via control means for selectively energizing the heating devices. Preferably for example, a manual switch means 58 such as the ignition switch for the engine is arranged in the circuit to initiate energizing of the heating devices, and a time delay, computer controlled means, or temperature responsive control means such as a thermostat 60 is also arranged in the circuit for selectively deenergizing the heating devices on occurrence of a particular event such as warm-up of the engine. Means for moving the fuel injectors and heating devices are also provided as is diagrammatically illustrated in FIGS. 1 and 2. Preferably for example, the shaft 40 is fixed to the heating devices and to a crank arm 62 or the like. The fuel injector yoke 34 and the crank arm are then connected via link means 64 to a moving means such as a PTC-heated wax actuator or a PTC-heated thermostat metal spring coil or the like as diagrammatically indicated at 66 in FIG. 1.

In that arrangement, the heating devices 32 and fuel injectors 26 are normally disposed in first positions as indicated in solid lines when operation of the engine 10 is initiated on a cold day by closing of the switch 58. Closing of the switch energizes the heating devices and the fuel injectors are positioned to direct a stream or spray 28 of fuel into each of the inlet channels 14 at intervals to be mixed with air in the inlet channels in conventional manner. The heating devices are positioned to intercept and heat that fuel and to deflect it toward the intake valve opening 16 to be vaporized to a substantial extent in the air to form the desired air-fuel mixture 30 furnished to the individual cylinders 18. In that way, the engine achieves efficient fuel use and provides for reduction of pollution emissions from the engine by assuring full burning of the fuel in the cylinders. Then, after a selected period when the engine has warmed-up for example, the actuator 66 is activated by the control means 60 or the like for moving the fuel injectors and heating devices to second positions indicated by the broken lines 26a and 32a in FIG. 1 wherein the fuel injectors now direct the fuel spray 28a directly into the cylinder intake valve openings 16 without being intercepted by respective heating devices, the heating devices cooperating by moving away from the path of the fuel stream as indicated in FIG. 1. The flexible seal means 22.3 permits the limited fuel injector movement necessary for redirecting the fuel spray at this new target. In that way the fuel spray 28a impinges on the respective intake valve 20 which has been substantially heated in response to the combustion events in the cylinders during the engine warm-up and continues to be substantially vaporized as the air-fuel mixture 30 is furnished to the engine cylinders. As will be understood, the fuel injector can be moved to direct the fuel onto any other warmed-up portion of the cylinder head or the like within the scope of the invention. At that point, the control means 60 also interrupts energizing of the heater devices as diagrammatically indicated in FIG. 1 for reducing power consumption by the heating devices. However, because the fuel sprays are no longer intercepted by the heating devices, a drop in temperature of the heating devices after being deenergized does not result in any cold spot being interposed in the fuel supply system such as might interfere with full fuel vaporizing thereafter during running operation of the engine.

Figure 4A:
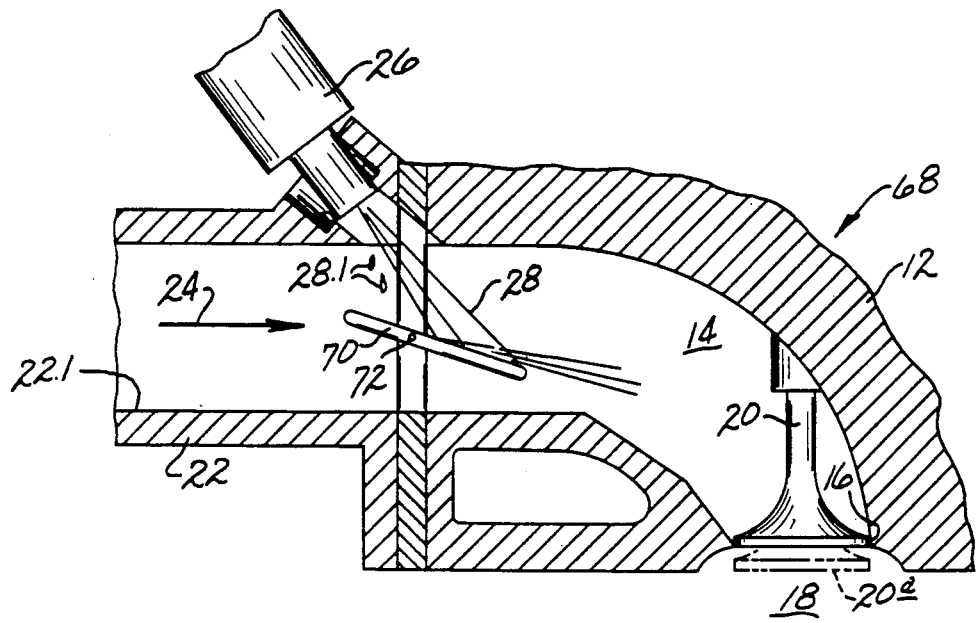
FIGS. 4A-4B are partial section views similar to FIG. 1 illustrating another preferred internal combustion engine of the invention in two stages of operation.
Figure 4E:
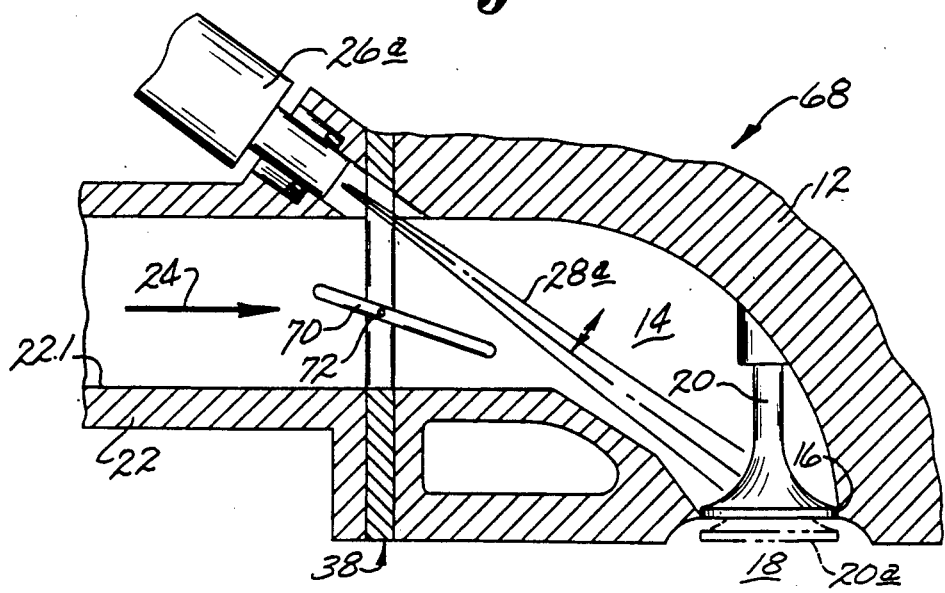

In another preferred embodiment of the invention as indicated at 68 in FIG. 4A, wherein corresponding components are identified with corresponding reference numerals, only the fuel injector is arranged to be selectively moved after engine warm-up occurs. That is, the fuel injector 26 normally directs fuel 28 onto a stationary heating device 70 to be heated and fully vaporized by the heating device during the engine warm-up period and is preferably deflected from the heating device into the cylinder intake valve opening 16. After engine warm-up is completed, the fuel injector is moved to the position 26a as previously described with reference to FIG. 1 to spray fuel past the heating device into the intake valve opening without being intercepted by the heating device as indicated in FIG. 4B. In another alternate embodiment of the invention, the fuel injectors move only part way to the position indicated at 26a in FIG. 4B, and a cylinder head surface as indicated at 41 is provided for intercepting, heating and deflecting the fuel into the valve opening 16 after the engine has warmed up as will be understood. In another preferred embodiment, the heating devices 70 are mounted on the support 38 by a support rod or the like 72 similar to the shaft 40 so that, in addition to (or instead of) extending into the inlet channels 24, the heating devices extend back into respective inlet tube passages 22.1 to assure that they normally intercept all fuel from the injectors including fuel which may dribble or fall from the injector nozzles as indicated at 28.1 in FIG. 4A. If desired such a heating device 70 can include an additional heating element 44 in the portion of the heater extending into the inlet tube passage.

Figure 5:
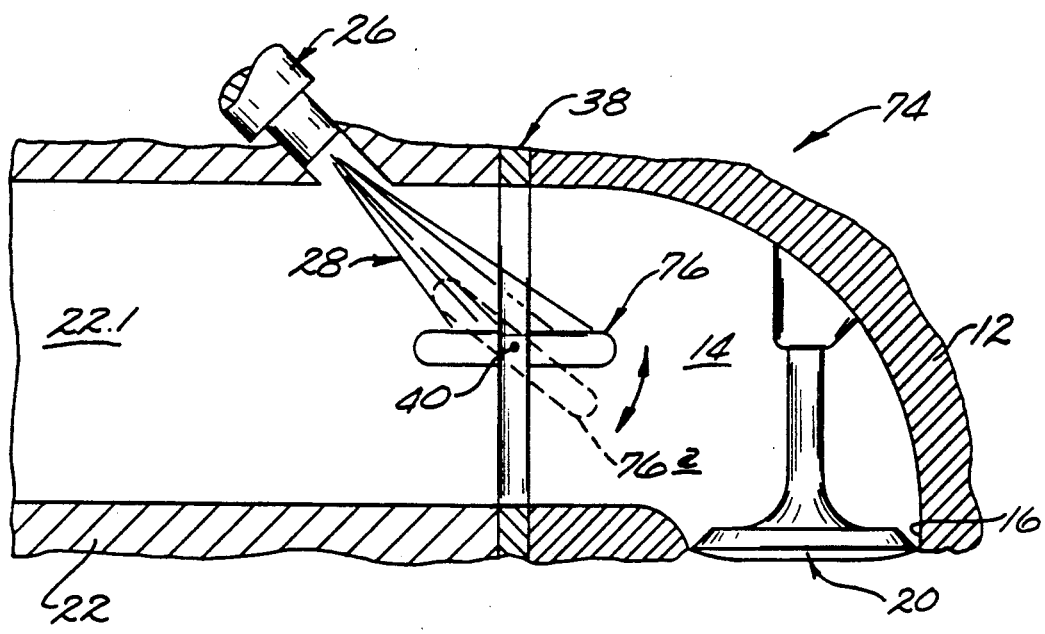
FIGS. 5-8 are partial section views similar to FIG. 1 respectively illustrating other preferred embodiments of the novel internal combustion engine of the invention.

In another preferred embodiment of the invention as indicated at 74 in FIG. 5, only the heating device 76 is arranged to be moved after or during engine warm-up. That is, a heating device 76 similar to the device 70 for example is pivoted on a shaft 40 to be moved between first and second positions after or during engine warm-up occurs as described above with reference to FIG. 1. In this arrangement, the fuel injector 26 is mounted to spray the stream of fuel 28 directly onto the intake valve in the intake valve opening 16 and the heater is normally arranged as shown in solid lines in FIG. 5 to intercept, heat and fully vaporize the fuel during engine warm-up. The heating device is arranged normally to deflect the intercepted and heated fuel directly into the intake valve opening or onto a selected cylinder head surface or the like as may be preferred during engine warm-up. After warm-up occurs, the heating device is moved to the position in broken lines in FIG. 5 so that substantially all of the fuel spray is directed past the heating device without being intercepted by the heating device after the heating device has been deenergized when engine warm-up has occurred.

Figure 6:
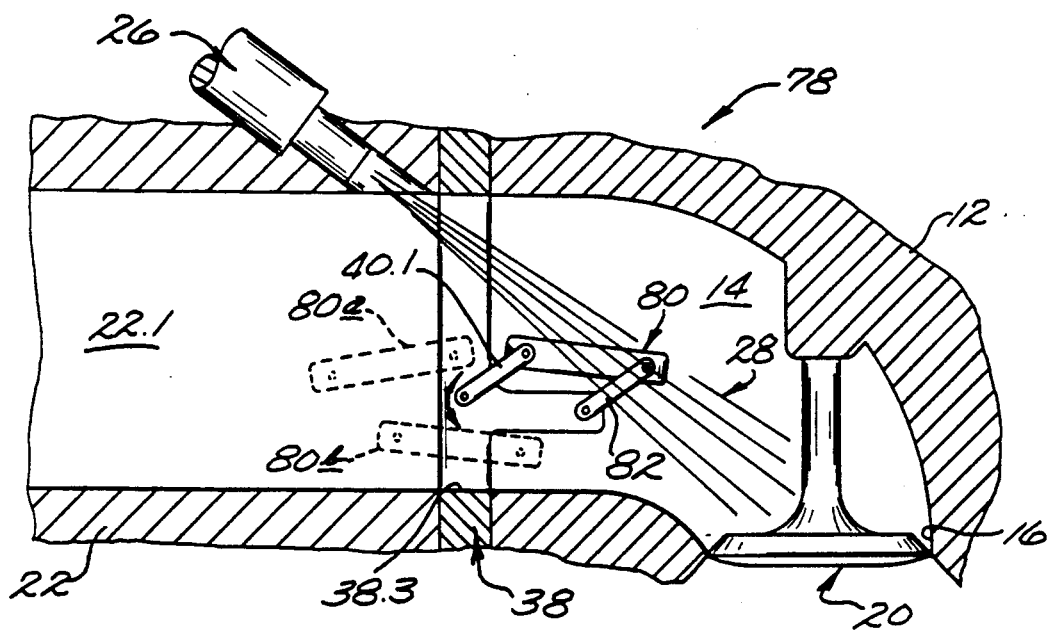

In another preferred embodiment of the invention as indicated at 78 in FIG. 6, only the heating device is arranged to be moved but in this case is movable well out of the air-fuel mixture flow path. That is, the shaft 40 is arranged to have a crooked or bell crank portion 40.1 extending across the support openings 38.3 to rotatably support the rear edge of the heating device 80. The support also mounts a similarly-shaped crooked bell crank idler shaft or member 82 which is mounted on the support and rotatably connected to the other edge of the heating device. The fuel injector is arranged to spray fuel directly at the intake valve opening 16. The heating device is normally disposed as indicated in solid lines in FIG. 6 to intercept, heat and deflect the fuel, preferably toward the intake valve opening, but on rotation of the shaft 40, the bell crank portion 40.1 of the shaft cooperates with the idler bell crank element to move the heating device to a second position indicated by broken lines 80a where the heater does not intercept the fuel spray but permits it to be sprayed directly on to the intake valve in the opening 16 after engine warm-up occurs. If the spacing between the bell crank components is sufficient, rotation of the shaft 40 is adapted to move the heating device substantially out of the central part of the air flow through the inlet tube passages for improved engine performance as indicated at 80b as will be understood.

Figure 7:
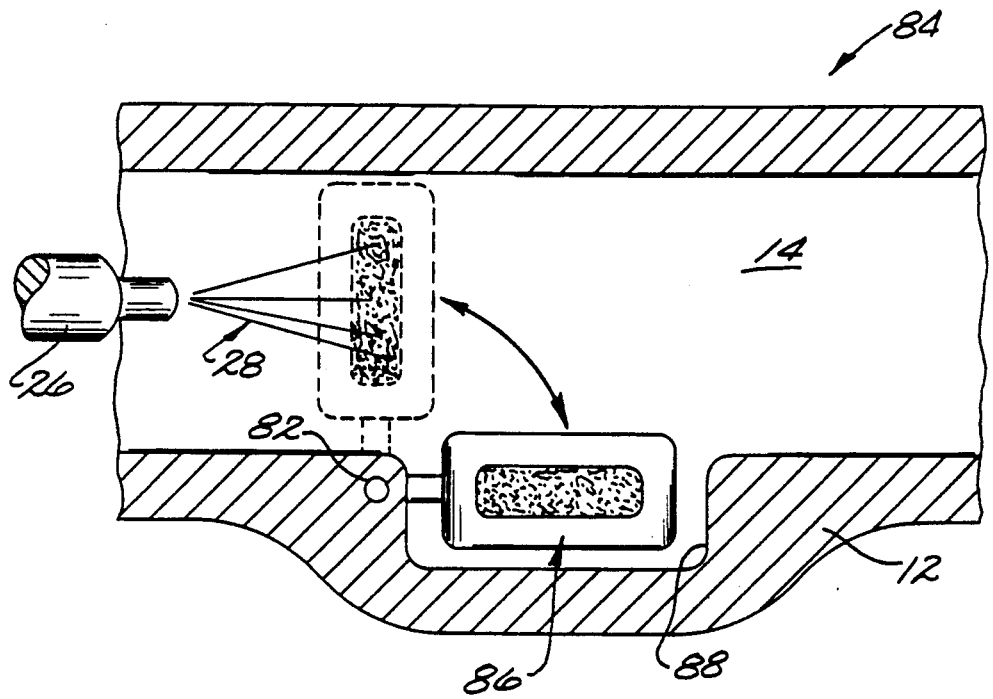
Figure 8:
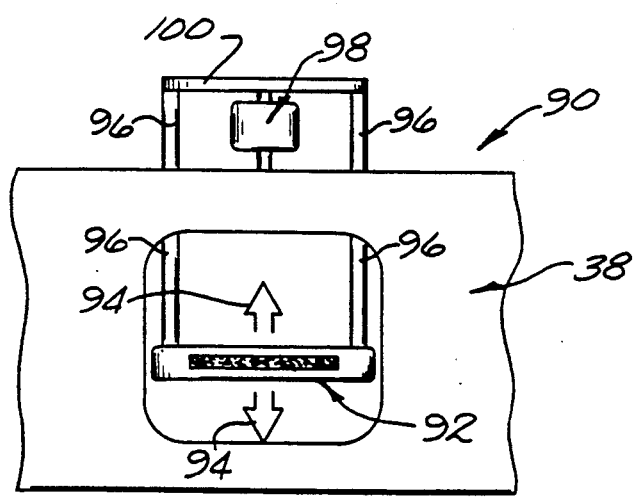

In another alternate embodiment of the invention as indicated at 84 in FIG. 7, the heating device 86 is mounted as indicated by shaft 82 to normally intercept a spray of fuel 28 but is adapted to be moved out of the inlet channel into a recess 88 in the wall of the inlet channel by moving means (not shown) during or after engine warm-up has occurred. In another preferred embodiment of the invention as indicated at 90 in FIG. 8, a heating device 92 is arranged for linear movement axially across an inlet channel 22 as indicated by arrows 94, or is arranged for linear movement axially along the length of the inlet channel as will be understood for moving the heating device between first and second positions respectively intercepting and permitting passage of fuel spray from a fuel injector. That is, as is diagrammatically indicated in FIG. 8, slide shafts 96 extend through a support 38 to mount the heating device in either of its first or second positions and an actuator 98 similar to the actuator 66 previously described is adapted to bear against a yoke 100 between the slide shafts moving the heating between its two positions as will be understood. A similar arrangement is suitable for achieving axial movement of the heating device along the length of inlet channel as will be understood. Other movable heating device arrangements are also possible. For example, two heating devices are adapted to be movably positioned in the same inlet channel, one of the heating devices being normally disposed to intercept fuel from the fuel injector to heat and deflect the spray to the second heating device which in turn heats and deflects the spray into an intake valve opening, the heating devices being movable axially into the channel after engine warm-up to pass the fuel spray between the heating devices directly into the intake valve opening without being intercepted by the heating devices.

It should be understood that although particular embodiments of the invention have been described by way of illustrating the invention, the invention includes all modifications and equivalents of the disclosed embodiments falling within the scope of the appended claims.

I claim:

1. Internal combustion engine comprising an inlet channel leading to a cylinder intake valve opening for furnishing an air-fuel mixture to an engine cylinder through the opening, a fuel injector for directing fuel into the inlet channel to be mixed with air in the channel to form an air-fuel mixture, a heating device arranged in the inlet channel for heating fuel received from the fuel injector, and means regulating the direction of fuel flow from the injector between a first path wherein the fuel is intercepted and heated by the heating device before being furnished to the engine cylinder when the engine is below a predetermined temperature and a second path permitting the fuel to be furnished to the engine cylinder without being intercepted by the heating device when the engine is above a predetermined temperature.

2. Internal combustion engine according to claim 1 wherein the heating device comprises an electrical resistance heating element, means for electrically energizing the heating device, and means for selectively interrupting electrical energizing of the heating device.

3. Internal combustion engine comprising a cylinder head having an air-fuel inlet channel leading to a cylinder intake valve opening, a fuel injector for directing fuel into the inlet channel, and a heating device arranged to intercept fuel directed by the fuel injector for heating the fuel when the engine is below a predetermined temperature, at least one of the fuel injector and heating device being movable relative to the other for selectively permitting the fuel to be directed into the inlet channel without being intercepted by the heating device when the engine is above a predetermined temperature.

4. Internal combustion engine comprising a cylinder head having an air inlet channel leading to a cylinder intake valve opening, a fuel injector directing fuel into the inlet channel, and a heating device arranged to intercept fuel directed by the fuel injector for heating the fuel, the fuel injector being selectively movable for permitting the fuel to be directed into the inlet channel without being intercepted by the heating device.

5. Internal combustion engine comprising a cylinder head having an air inlet channel leading to a cylinder intake valve opening, a fuel injector directing fuel into the inlet channel, and a heating device arranged to intercept fuel directed by the fuel injector for heating the fuel when the engine is below a predetermined temperature, the heating device being selectively movable for permitting the fuel to be directed into the inlet channel without being intercepted by the heating device where the engine is above a predetermined temperature.

6. Internal combustion engine according to claim 5 wherein the heating device is located for deflecting intercepted fuel into the cylinder intake valve opening.

7. Internal combustion engine according to claim 6 wherein the fuel injector is movable for directing unintercepted fuel into the cylinder intake valve opening.

8. Internal combustion engine according to claim 6 wherein the cylinder head has a surface oriented relative to the fuel injector for deflecting fuel unintercepted by the heating device into the cylinder intake valve opening.

9. Internal combustion engine comprising a cylinder head having an inlet channel leading to a cylinder intake valve opening, an inlet tube member furnishing air to the inlet channel, a fuel injector directing fuel into the inlet channel, a support secured between the cylinder head and inlet tube member, and a heating device mounted on the support extending into the inlet channel for normally intercepting fuel directed by the fuel injector for heating the fuel, the heating device being movable for permitting the fuel to be directed into the inlet channel without being intercepted by the heating device.

10. Internal combustion engine according to claim 9 wherein the heating device is mounted on the support for pivotal movement between a first position intercepting fuel directed by the fuel injector and a second position permitting the fuel to be directed into the inlet channel without being intercepted by the heating device.

11. Internal combustion engine according to claim 9 wherein the heating device is mounted on the support for axial movement between a first position intercepting fuel directed by the fuel injector and a second position permitting the fuel to be directed into the inlet channel without being intercepted by the heating device.

12. Internal combustion engine according to claim 9 wherein the heating device is located on the support for deflecting intercepted fuel into the cylinder intake valve opening.

13. Internal combustion engine according to claim 12 wherein the fuel injector is movable for directing unintercepted fuel into the cylinder intake valve opening.

14. Internal combustion engine according to claim 12 wherein the cylinder head has a surface oriented relative to the fuel injector for deflecting fuel unintercepted by the heating device into the cylinder intake valve opening.

15. Internal combustion engine according to claim 9 wherein bell crank means pivotally mount the heating device thereon for movement between a first position intercepting fuel from the fuel injector for heating the fuel and a second position permitting fuel from the injector to be directed into the cylinder intake valve opening without being intercepted by the heating device.

16. Internal combustion engine according to claim 15 wherein the fuel injector is located for directing fuel unintercepted by the heating device into the cylinder intake valve opening.

17. Internal combustion engine comprising a cylinder head provided with a plurality of cylinder intake valve openings, inlet valves for the respective cylinder intake valve openings, and inlet channels leading to the respective cylinder intake valve openings, an inlet tube member having inlet tubes furnishing air to the respective inlet channels, the inlet tube member being provided with fuel injectors directing fuel into the respective inlet channels, a support secured between the cylinder head and inlet tube member, a plurality of heating devices mounted on the support extending into the respective inlet channels for normally intercepting fuel directed by the fuel injectors for heating the fuel, the heating devices being selectively movable on the support in the inlet channels for permitting the fuel to be directed into the inlet channels without being intercepted by heating devices, and means for selectively moving the heating devices.

18. Internal combustion engine according to claim 17 wherein the heating devices are mounted on the support for pivotal movement between first positions intercepting fuel directed by the respective fuel injectors and second positions permitting the fuel to be directed into the respective inlet channels without being intercepted by the respective heating devices.

19. Internal combustion engine according to claim 18 wherein the means for moving the heating device is mounted on the support.

20. Internal combustion engine according to claim 17 wherein the heating devices are mounted on the support for axial movement between first positions intercepting fuel directed by the respective fuel injectors and second positions permitting the fuel to be directed into the respective inlet channels without being intercepted by the respective heating devices.

21. Internal combustion engine according to claim 20 wherein the means for moving the heating devices is mounted on the support.

22. Internal combustion engine according to claim 17 wherein the heating devices are located on the support for deflecting intercepted fuel into the respective cylinder intake valve openings.

23. Internal combustion engine according to claim 22 wherein the fuel injectors are movable for directing unintercepted fuel into the respective cylinder intake valve openings.

24. Internal combustion engine according to claim 22 wherein the cylinder head has surfaces in the respective inlet channels oriented relative to the respective fuel injectors for deflecting fuel unintercepted by the respective heating devices into the respective cylinder intake valve openings.

25. Internal combustion engine according to claim 17 wherein the heating devices each have bell crank means pivotally mounting the heating devices for movement between a first position intercepting fuel from a respective fuel injector and a second position permitting fuel from the injector to be directed into a respective inlet channel without being intercepted by the heating device.

26. Internal combustion engine according to claim 25 wherein the fuel injectors are located for directing fuel unintercepted by the respective heating devices into the respective cylinder intake valve openings.

27. An internal combustion engine according to claim 17 wherein the fuel injectors are disposed in the respective inlet tubes and the heating devices have portions extending into the respective inlet tubes for normally intercepting any fuel leaking from fuel injectors in the respective inlet tubes.

28. A fuel heater for an internal combustion engine of the injector type comprising a support to be secured between cylinder head and intake tube means on the engine, a heating device mounted on the support to extend in one direction into an inlet channel in the cylinder head means leading to a cylinder intake valve opening for normally intercepting fuel directed into the inlet channel by a fuel injector, the heating device being movable on the support for permitting fuel to be directed into the inlet channels by the fuel injector without being intercepted by the heating device.

29. A fuel heater according to claim 28 wherein the heating device is mounted on the support for pivotal movement between a first position for intercepting fuel directed by the fuel injector and a second position permitting the fuel to be directed into the inlet channel without being intercepted by the heating device.

30. A fuel heater according to claim 29 having means mounted on the support for selectively moving the heating device.

31. A fuel heater according to claim 28 wherein the heating device is mounted on the support for axial movement between a first position for intercepting fuel directed by the fuel injector and a second position permitting the fuel to be directed into the inlet channel without being intercepted by the heating device.

32. A fuel heater according to claim 31 having means mounted on the support for selectively moving the heating device.

33. A fuel heater according to claim 28 wherein the heating device is located on the support for deflecting intercepted fuel into the cylinder intake valve opening.

34. A fuel heater according to claim 28 wherein the heating device has portions extending in another direction to extend into an inlet tube in an inlet tube member on the engine mounting fuel injectors therein for normally intercepting any fuel leaking from the fuel injector in the inlet tube.

35. A fuel heater for an internal combustion engine of the injector type comprising a support to be secured between cylinder head and intake tube means on the engine, a plurality of heating devices mounted on the support to extend in one direction into respective ones of a plurality of inlet channels in the cylinder head means leading to respective cylinder intake valve openings for normally intercepting fuel directed into the respective inlet channels for heating the fuel, the heating devices being movable on the support in the respective inlet channels for permitting the fuel to be directed into the inlet channels without being intercepted by the heating devices.

36. A fuel heater according to claim 35 wherein the heating devices are mounted on the support for pivotal movement between first positions intercepting fuel directed by respective fuel injectors and second positions permitting the fuel to be directed into the respective inlet channels without being intercepted by the heating devices.

37. A fuel heater according to claim 36 having means mounted on the support for selectively moving the heater devices.

38. A fuel heater according to claim 35 wherein the heating devices are mounted on the support for axial movement between first positions intercepting fuel directed by respective fuel injectors and second positions permitting the fuel to be directed into the respective inlet channels without being intercepted by the heating devices.

39. A fuel heater according to claim 38 having means mounted on the support for selectively moving the heater devices.

40. A fuel heater according to claim 36 wherein the heating devices are located on the support for deflecting intercepted fuel into the respective cylinder intake valve openings.

41. A fuel heater according to claim 35 having portions of each heating device extending in another direction to be received in respective inlet tubes on the engine for normally intercepting any fuel falling from fuel injectors in the respective inlet tubes.

* * * * *